United States Patent
Oh et al.

(10) Patent No.: US 8,920,641 B2
(45) Date of Patent: Dec. 30, 2014

(54) END-CAP STRUCTURE OF OIL FILTER FOR VEHICLE

(71) Applicants: Chang-Eun Oh, Kyunggi-do (KR); Nam-Woong Lee, Inchun-si (KR); Min-Su Lee, Inchun-si (KR); Kang-Seok Kim, Seoul (KR); Sang-Pyo Lee, Seoul (KR)

(72) Inventors: Chang-Eun Oh, Kyunggi-do (KR); Nam-Woong Lee, Inchun-si (KR); Min-Su Lee, Inchun-si (KR); Kang-Seok Kim, Seoul (KR); Sang-Pyo Lee, Seoul (KR)

(73) Assignees: Chang-Eun Oh, Kyunggi-Do (KR); Nam-Woong Lee, Inchun-Si (KR)

( * ) Notice: Subject to any disclaimer, the term of this patent is extended or adjusted under 35 U.S.C. 154(b) by 0 days.

(21) Appl. No.: 14/148,153

(22) Filed: Jan. 6, 2014

(65) Prior Publication Data
US 2014/0332456 A1 Nov. 13, 2014

(30) Foreign Application Priority Data
May 8, 2013 (KR) .......................... 10-2013-0051757

(51) Int. Cl.
*B01D 35/147* (2006.01)
*B01D 35/00* (2006.01)
*B01D 27/10* (2006.01)

(52) U.S. Cl.
CPC ............ *B01D 35/005* (2013.01); *B01D 35/147* (2013.01); *B01D 27/103* (2013.01)
USPC .......................... 210/130; 210/430; 210/493.2

(58) Field of Classification Search
CPC .. B01D 27/08; B01D 27/103; B01D 29/0027; B01D 35/18; B01D 35/147; B01D 35/306; B01D 36/02; B01D 2201/162
USPC ................. 210/130, 167.05, 184, 232, 416.4, 210/416.5, 429, 430, 433.1, 493.2
See application file for complete search history.

(56) References Cited

U.S. PATENT DOCUMENTS

| | | | |
|---|---|---|---|
| 3,807,561 A * | 4/1974 | Cullis | ........................... 210/130 |
| 3,861,646 A | 1/1975 | Douglas | |
| 4,196,886 A | 4/1980 | Murray | |
| 4,906,365 A | 3/1990 | Baumann et al. | |
| 5,468,386 A | 11/1995 | Ardes | |
| 5,783,078 A | 7/1998 | Roll et al. | |
| 5,814,215 A | 9/1998 | Bruss et al. | |

(Continued)

FOREIGN PATENT DOCUMENTS

| | | |
|---|---|---|
| JP | 1999507865 | 7/1999 |
| JP | 2000140525 | 5/2000 |

(Continued)

*Primary Examiner* — Matthew O Savage
*Assistant Examiner* — Akash Varma
(74) *Attorney, Agent, or Firm* — Joseph G. Chu; Vic Y. Lin; Innovation Capital Law Group, LLP

(57) ABSTRACT

Disclosed herein is an end-cap structure of an oil filter for vehicles. The end-cap includes a base cap which has a hole in a central portion thereof, and a hook cap which is installed in the hole so as to be movable upwards or downwards. In this structure, a surface of the hook cap that comes into contact with the base cap when the hook cap moves upwards is a sealing portion. When the hook cap moves downwards, the sealing state is released and a bypass is formed. According to the structure of the present invention, since the sealing portion of the end-cap can be protected from heat, the quality of the product, the productivity, the economic efficiency, etc. can be enhanced.

4 Claims, 5 Drawing Sheets

(56) References Cited

U.S. PATENT DOCUMENTS

| | | |
|---|---|---|
| 6,706,181 B1 | 3/2004 | Baumann et al. |
| 7,060,184 B2 | 6/2006 | Cline et al. |
| 7,141,166 B2 * | 11/2006 | Sugiura et al. ............... 210/234 |
| 2001/0010297 A1 * | 8/2001 | Pulek et al. ............... 210/493.2 |
| 2008/0035540 A1 * | 2/2008 | Pflueger et al. ............... 210/133 |
| 2014/0083951 A1 * | 3/2014 | Malgorn et al. ............... 210/741 |

FOREIGN PATENT DOCUMENTS

| | | |
|---|---|---|
| KR | 200325385 | 9/2003 |
| KR | 200378939 | 3/2005 |
| KR | 20060075618 | 7/2006 |
| KR | 200423005 | 8/2006 |
| WO | 0130480 | 5/2001 |

* cited by examiner

END-CAP STRUCTURE OF OIL FILTER FOR VEHICLE

BACKGROUND OF THE INVENTION

1. Field of the Invention

The present invention relates generally to an oil filter for vehicles and, more particularly, to an end-cap structure of an oil filter for vehicles which is designed such that thermal deformation of the end-cap can be minimized when the filter is manufactured, and reliable sealing can be maintained.

2. Description of the Related Art

As is well known to those skilled in this art, engines for vehicles include sliding parts such as a cylinder and a piston and rotating parts such as a crank and a cam. When the engine is operated, moving parts generate a lot of frictional heat. If the state of being heated by frictional heat is continuous, abrasion damage is caused, whereby vehicle driving may become impossible. To prevent this problem, engines are provided with a lubricating device which supplies an appropriate amount of oil to the moving parts of an engine.

An oil filter for vehicles filters oil to be supplied to the moving parts of the engine so that as clean oil as possible can be supplied to the moving parts.

Referring to FIGS. 1 and 2, a conventional oil filter 1 includes a filter media 2 which defines a passage 3 in a central portion thereof, and upper and lower end-caps 4 and 5 which are respectively attached to upper and lower ends of the filter media 2. In detail, the upper end-cap 4 is made of plastic. A hole 6 is formed in a central portion of the upper end-cap 4, and a flange ring 7 protrudes downwards from a portion of the upper end-cap 4 that defines the hole 6.

The oil filter 1 is manufactured in such a way that the upper and lower end-caps 4 and 5 are formed using plastic, inner surfaces of the upper and lower end-caps 4 and 5 that face each other are melted by heat, and then the opposite ends of the filter media 2 are respectively pressed onto the melted surfaces of the upper and lower end-caps 4 and 5. For example, oil filters which have the above-mentioned structure and are manufactured by the above-mentioned method were proposed in Korean Utility Model Registration No. 325385, No. 378939 and No. 423005 and Korean Patent Laid-open Publication No. 2006-75618.

The oil filter 1 manufactured by the above-mentioned method is installed in an oil housing. A housing core is inserted into the passage 3. Reference numeral 8 denotes an elastic plunger of a bypass or relief valve which is provided on an upper end of the core. The end of the flange ring 7 and the valve plunger 8 make contact with each other, thus sealing the hole 6 of the end-cap 4. Referring to the arrow ① of FIG. 1, in this state, oil passes through the filter media 2 and flows through the passage 3 before being supplied to the engine, and the oil circulates along this path.

The filter media functions to filter oil, but the efficiency thereof is reduced in proportion to the degree of contamination of the oil and the period of use thereof. At last, the filter media 2 may be clogged so that it is impossible for oil to pass through the filter media 2. In this case, supply of oil to the engine is completely interrupted, thereby causing loss of lubricant and cooling functions. As a result, the engine may break down. To prevent this problem, when the filter media 2 is clogged, the plunger of the bypass valve is operated.

In detail, when the filter media 2 is clogged, a pressure difference between the inside and the outside of the oil filter occurs. The plunger 8 is moved by the pressure difference in a direction in which a sealing state formed by contact between the ring 7 and the plunger 8 is released. Thereby, the bypass valve and the hole 6 open. Referring to the arrow ② of FIG. 1, in this state, oil passes through the hole 6 of the end-cap 4 without passing through the filter media 2 and then is supplied to the engine via the passage 3, and the oil circulates along this path.

In this case, there is high probability of the oil that is supplied to the engine through this path is very contaminated. Therefore, so long as the filter media 2 is normally operated, the end of the flange ring 7 and the surface of the valve plunger 8 must be maintained as close as possible in order to prevent oil that is not filtered from being directly supplied to the engine.

However:

1) in a manufacturing process, when the inner surface of the end-cap 4 is melted, the end of the ring 7 is easily deformed or damaged by heat. As a result, there is difficulty maintaining the close contact between the end of the ring 7 and the surface of the valve plunger 8.

2) since such deformation irregularly occurs on each end-cap 4, full inspection for associated sealing portions must be conducted every time an end-cap is manufactured. Depending on the degree of deformation, whether the manufactured end-cap is defective or not is determined. In other words, even in the full inspection of the end-cap 4, some deformation or damage must be allowed.

3) Consequentially, this means that some contaminated oil may be directly supplied to the engine through the hole 6 of the end-cap 4 despite the filtering function of the oil filter 1 being normal.

4) Furthermore, even when only the end of the ring 7 is damaged, the entirety of the end-cap 4 must be discarded, thus reducing economic efficiency.

SUMMARY OF THE INVENTION

Accordingly, the present invention has been made keeping in mind the above problems occurring in the prior art, and an object of the present invention is to provide an end-cap structure which prevents thermal deformation or damage on a sealing portion from occurring during the manufacturing process, thus realizing a reliable sealing structure in an oil filter to which the end-cap is applied.

In order to accomplish the above object, the present invention provides an end-cap structure of an oil filter for vehicles, including a base cap having a mounting hole in a central portion thereof, and a hook cap installed in the mounting hole so as to be movable upwards or downwards, the hook cap including: a hollow body provided to be open on a lower end thereof and closed on an upper end thereof; a contact flange hook protruding outwards from the hollow body so that when the hook cap moves upwards, the contact flange hook comes into contact with a lower surface of the base cap so as to limit the upward movement of the hook cap, and a sealing against external oil is formed between the hook cap and the base cap; and a vertical support part extending from a perimeter of the hollow body towards an upper end of the contact flange hook, with a locking protrusion provided on an upper end of the vertical support part so that when the hook cap moves downwards, the locking protrusion comes into contact with an upper surface of the base cap so as to limit the downward movement of the hook cap, and a bypass is formed between the vertical support part and the hollow body, the bypass passing through the contact flange hook.

The contact flange hook may include a melting prevention protrusion provided below the contact surface at a predetermined position corresponding to the contact surface that makes contact with the lower surface of the base cap.

The melting prevention protrusion may be designed such that an outer diameter thereof is greater than an outer diameter of the contact surface.

The vertical support part may comprise at least one elastic piece.

The vertical support part may include an auxiliary protrusion protruding outwards so that when the hook cap moves upwards, the auxiliary protrusion comes into contact with the upper surface of the base cap, thus preventing the hook cap from being arbitrarily moved downwards.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 3:
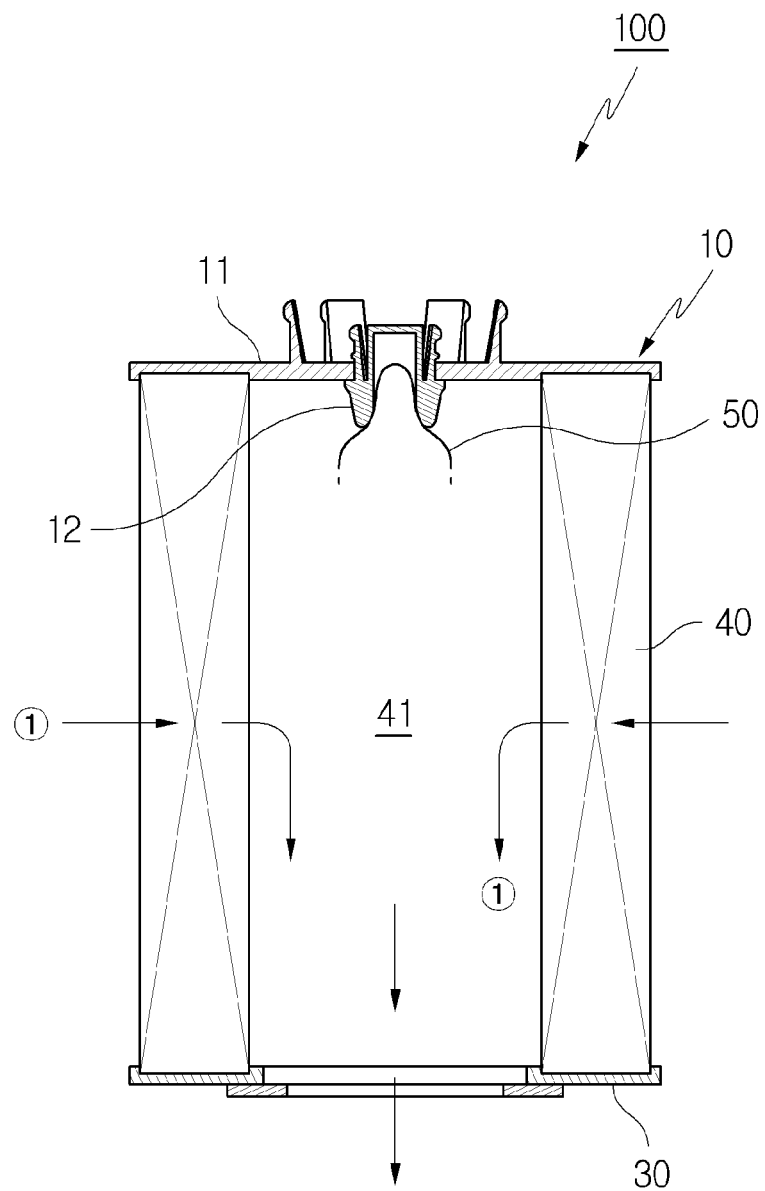
FIG. 3 is a sectional view of an oil filter provided with an end-cap structure according to the present invention.

Hereinafter, an end-cap structure (referred to as an 'end-cap') according to a preferred embodiment of the present invention will be described in detail with reference to the attached drawings. In FIG. 3 and below, the end-cap according to the present invention is designated by reference numeral 10.

Referring to FIG. 3, the oil filter 100 includes upper and lower end-caps 10 and 30 and a filter media 40. The filter media 40 is configured to have a passage 41 in a central portion thereof. Opposite ends of the filter media 40 are respectively fixed to the end-caps 10 and 30. The end-cap of the present invention means the upper end-cap 10 and includes a base cap 11 which has a mounting hole in a central portion thereof, and a hook cap 12 which is installed in the mounting hole of the base cap 11 so as to be movable upwards or downwards.

Although similar to the conventional technique, a process of manufacturing the oil filter 100 is as follows:

the end-caps 10 and 30 are formed of plastic;

inner surfaces of the end-caps 10 and 30 that face each other are melted by heat; and the opposite upper and lower ends of the filter media 40 are pressed onto the melted surfaces of the end-caps 10 and 30, thus forming the oil filter 100.

The passage 41 is a passage through which oil that flows through the filter media 40 or a bypass is supplied to the engine of the vehicle.

The oil filter 100 manufactured through the above-mentioned process is installed in an oil housing. A housing core is inserted into the passage 41. Reference numeral 50 denotes an elastic plunger of a bypass or relief valve which is provided on an upper end of the core. The hook cap 12 makes contact with an upper end of a plunger 50.

Figure 4:
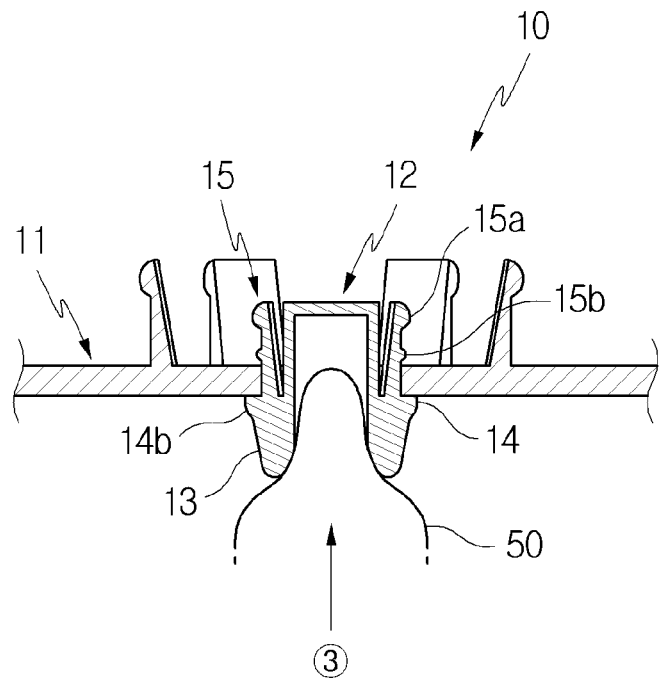
FIG. 4 is a sectional view of the end-cap structure according to the present invention.

Referring to FIG. 4, the end-cap 10 includes a base cap 11 and a hook cap 12. The base cap 11 has a disk shape, and the mounting hole (not designated by reference numeral) is formed in a central portion of the base cap 11. Further, the shape of the base cap 11 of the present invention is not limited to this, so long as it has a mounting hole in a central portion thereof. The hook cap 12 is installed in the mounting hole of the base cap 11 so as to be movable upwards or downwards. Hereinafter, the hook cap 12 will be described in detail.

The hook cap 12 integrally includes a hollow body 13, a contact flange hook 14 and a vertical support part 15.

The hollow body 13 is open on a lower end thereof and is closed on an upper end thereof. The reason why the upper end of the hollow body 13 is closed is to prevent external oil from entering the oil filter 100 through a central hollow space of the hollow body 13. The reason why the lower end of the hollow body 13 is open is to allow the hollow body 13 to be placed onto the upper end of the valve plunger 50 which is disposed below and is brought into contact with the hollow body 13. Here, a mere depression also falls within the bounds of the term "opening".

The hook 14 protrudes outwards from the hollow body 13. When the hook cap 12 moves upwards, the hook 14 makes contact with a lower surface of a portion of the base cap 11 that surrounds the mounting hole, so that the hook cap 12 can no longer move upwards. A contact surface (designated by reference numeral 14a of FIG. 5) of the hook 14 functions as a sealing portion which prevents bypass supply of oil between the hook 14 and the lower surface of the base cap 11.

Figure 1:
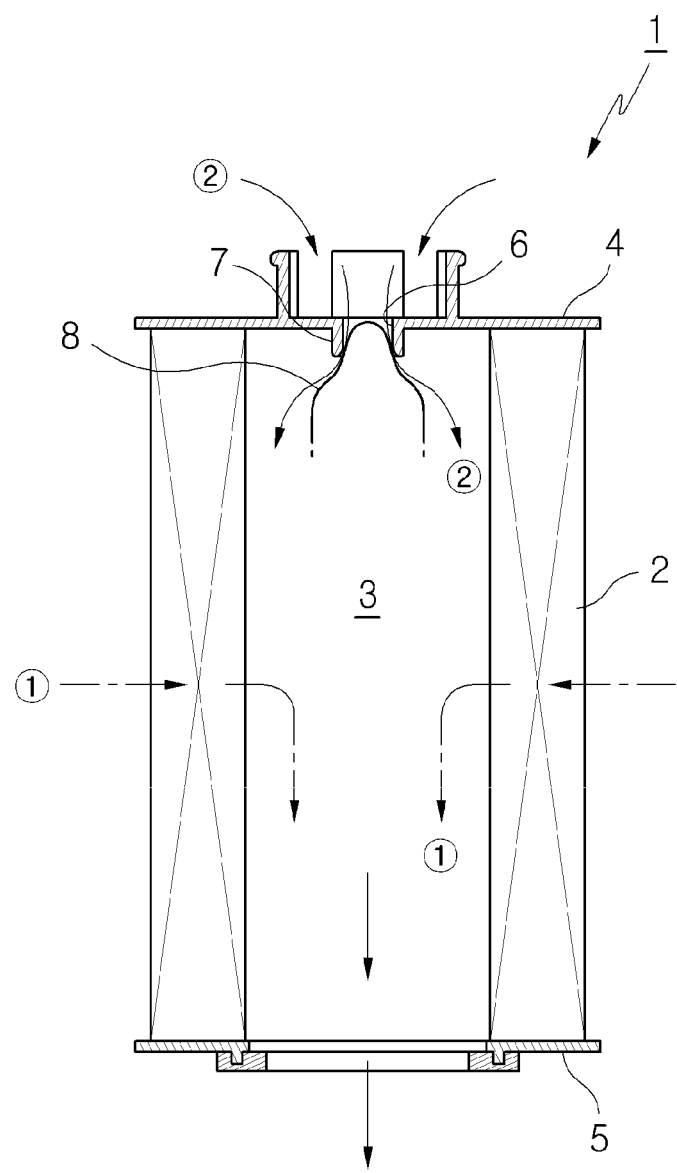
FIG. 1 is a sectional view of a conventional oil filter.
Figure 2:
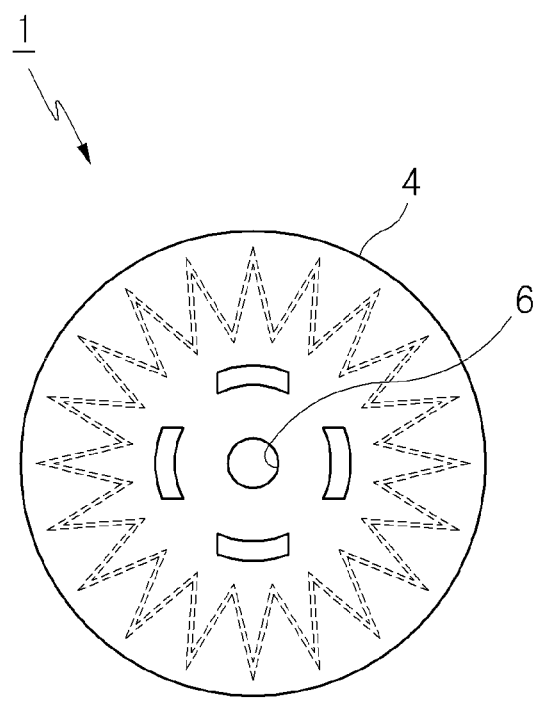
FIG. 2 is a plan view of FIG. 1.

Due to the above-mentioned structure of the flange hook 14, the contact surface 14a that is the sealing portion is prevented from being exposed to melting heat applied from the rear. As such, the contact surface 14a is almost not affected by melting heat, whereby thermal deformation or damage of the sealing portion can be minimized or prevented. Ultimately, sealing of the oil filter (100 of FIG. 1) can be reliably realized, and the productivity can also be markedly enhanced. Even if the sealing portion is defective, it is required to replace only the hook cap 12 with a new one without replacing the base cap 11 with another.

Figure 6:
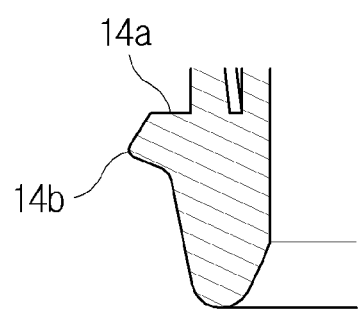
FIG. 6 is a view showing a modification of the end-cap structure according to the present invention.

The hook 14 includes, as a means for preventing the contact surface 14a from being exposed to heat, a melting prevention protrusion 14b which is provided below the contact surface 14a at a predetermined position corresponding to the contact surface 14a that makes contact with the lower surface of the portion of the base cap 11 that surrounds the mounting hole. Referring to FIG. 6, the melting prevention protrusion 14b is designed to have a larger diameter than that of the contact surface 14a. In this case, melting heat collides with the melting prevention protrusion 14b and spreads outwards from the hook 14. Therefore, the contact surface 14a can be reliably protected from the melting heat.

The vertical support part 15 extends upwards from the perimeter of the hollow body 13. A locking protrusion 15a is provided on an upper end of the vertical support part 15 so that when the hook cap 12 moves downwards, the locking protrusion 15a makes contact with an upper surface of the portion of the base cap 11 that surrounds the mounting hole, thus limiting downward movement of the hook cap 12. That is, the hook cap 12 is mounted in the mounting hole of the base cap 11 and is able to move upwards or downwards by the distance between the locking protrusion 15a and the contact surface 14a. When the hook cap 12 moves downwards, the sealing made by the contact surface 14a is removed, a bypass which passes through the hook 14 is formed between the vertical support part 15 and the hollow body 13.

In this embodiment, the vertical support part 15 comprises two or more elastic pieces. By virtue of the elastic pieces 15, the hook cap 12 can be reliably hooked to and supported in the mounting hole of the base cap 11. The bypass is defined by a space between the elastic pieces 15. Preferably, each elastic piece 15 includes an auxiliary protrusion 15b which protrudes outwards. When the hook cap 12 moves upwards, the auxiliary protrusion 15b is locked to the upper surface of the base cap 11, thus preventing the hook cap 12 from being arbitrarily moved downwards.

The arrow ③ of FIG. 4 illustrates the state in which the valve plunger 50 is elastically supported by a spring and the hook cap 12 is moved upwards to the maximum position by the elastic force.

Referring to FIGS. 3 and 4, in the case where the hook cap 12 is moved upwards to the maximum position, external oil passes through the filter media 40 and is filtered by it before entering the passage 41. Thereafter, the external oil is supplied towards the engine of the vehicle. However, the expendable filter media 40 is reduced in usefulness in proportion to of the degree of contamination of the oil and a period of use thereof. After the lifetime of the filter media 40 has expired, it becomes impossible for oil to pass through the filter media 40.

Then, a pressure difference between the inside and the outside of the oil filter 100 is caused. Thereby, the plunger 50 of the bypass valve and the hook cap 12 are operated.

Figure 5:
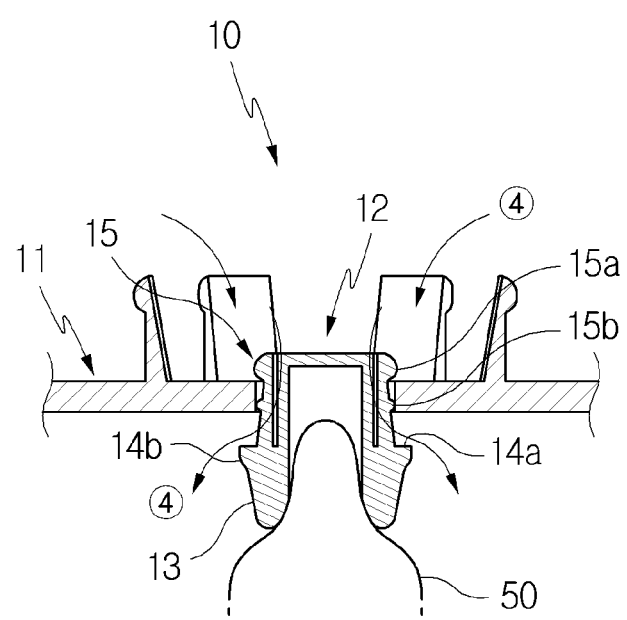
FIG. 5 is a view illustrating the operation of FIG. 4.

Referring to FIG. 5, the valve plunger 50 and the hook cap 12 are moved downwards to the maximum position at the same time by the pressure difference or internal negative pressure. At this time, the contact surface 14a of the hook cap 12 moves away from the base cap 11 so that the sealing between the contact surface 14a and the lower surface of the portion of the base cap 11 that surrounds the mounting hole is removed.

Then, referring to the arrows ④ of FIG. 5, a bypass, which passes through the hook 14 that has released the sealing state and then flows through the passage (designated by reference numeral 41 of FIG. 3), is formed by the space between the vertical support part 15 and the hollow body 13. In this case, oil that has not been filtered can be directly supplied towards the engine through the bypass.

As described above, an end-cap according to the present invention includes a base cap and a hook cap which is provided in a central portion of the base cap so as to movable upwards or downwards. When the hook cap moves upwards and makes contact with the lower surface of the base cap a seal against external oil is formed. That is, in the present invention, an upper contact surface of the hook cap becomes the sealing portion, and this portion is a safe portion which is prevented from being exposed to heat during a melting process. As such, according to the present invention:

the thermal deformation or damage of the sealing portion can be minimized or prevented, so that sealing can be reliably formed in the oil filter, and this end-cap structure makes it possible to increase the productivity; and even if the sealing portion is defective due to thermal damage, it is required to replace only the hook cap with a new one, whereby significant economic effects can be achieved compared to the case where the entire end-cap is replaced with a new one.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. An end-cap structure of an oil filter for vehicles, comprising a base cap having a mounting hole in a central portion thereof, and a hook cap installed in the mounting hole so as to be movable upwards or downwards, the hook cap comprising:

a hollow body provided to be open on a lower end thereof and closed on an upper end thereof;

a contact flange protruding outwards from the hollow body so that when the hook cap moves upwards, the contact flange comes into contact with a lower surface of the base cap so as to limit the upward movement of the hook cap, and a sealing against external oil is formed between the hook cap and the base cap;

a vertical support part extending from a perimeter of the hollow body and from an upper end of the contact flange, with a locking protrusion provided on an upper end of the vertical support part so that when the hook cap moves downwards, the locking protrusion comes into contact with an upper surface of the base cap so as to limit the downward movement of the hook cap, and a bypass is formed between the vertical support part and the hollow body, the bypass passing through the contact flange; and wherein the vertical support part comprises an auxiliary protrusion protruding outwards so that when the hook cap moves upwards, the auxiliary protrusion comes into contact with the upper surface of the base cap, thus preventing the hook cap from being arbitrarily moved downwards.

2. The end-cap structure as set forth in claim 1, wherein the contact flange comprises a melting prevention protrusion provided below a contact surface at a predetermined position corresponding to the contact surface that makes contact with the lower surface of the base cap.

3. The end-cap structure as set forth in claim 2, wherein the melting prevention protrusion is designed such that an outer diameter thereof is greater than an outer diameter of the contact surface.

4. The end-cap structure as set forth in claim 1, wherein the vertical support part comprises at least one elastic piece.

* * * * *